United States Patent [19]

Singh et al.

[11] Patent Number: 5,235,927
[45] Date of Patent: Aug. 17, 1993

[54] AUTOPILOT SYSTEM

[75] Inventors: Harjit Singh, Hayling Island; Andrew W. Clark, Portsmouth, both of United Kingdom

[73] Assignee: Nautech Limited, Portsmouth, England

[21] Appl. No.: 968,257

[22] Filed: Oct. 29, 1992

Related U.S. Application Data

[63] Continuation of Ser. No. 631,377, Dec. 20, 1990, abandoned.

[30] Foreign Application Priority Data

Dec. 22, 1989 [GB] United Kingdom ............... 8929117

[51] Int. Cl.⁵ ......................................... B63H 25/04
[52] U.S. Cl. ................... 114/144 E; 318/588
[58] Field of Search ............ 114/144 E, 144 R; 244/197; 318/588

[56] References Cited

U.S. PATENT DOCUMENTS

| | | | |
|---|---|---|---|
| 2,401,771 | 6/1946 | Nye | 114/144 E |
| 2,499,471 | 3/1950 | Dunning | 114/144 E |
| 2,861,756 | 11/1958 | Feucht et al. | |
| 3,027,878 | 4/1962 | Keyt et al. | |
| 3,033,495 | 5/1962 | Sikora | |
| 3,946,691 | 3/1976 | Freeman | 318/588 |
| 3,995,205 | 11/1976 | Klees | 318/588 |
| 4,223,624 | 9/1980 | Iyeta | 114/144 E |
| 4,681,055 | 7/1987 | Cyr | 114/144 E |

FOREIGN PATENT DOCUMENTS

| | | | |
|---|---|---|---|
| 0471839 | 1/1975 | Australia | 114/144 E |
| 3826909 | 2/1989 | Fed. Rep. of Germany | 114/144 E |

*Primary Examiner*—Sherman Basinger
*Assistant Examiner*—Thomas J. Brahan
*Attorney, Agent, or Firm*—Merchant, Gould, Smith, Edell, Welter & Schmidt

[57] ABSTRACT

An autopilot system for a vessel such as a boat has an autopilot unit connected via a drive to the rudder or other direction determining means of the vessel. When the autopilot unit is operating normally, direction information from e.g. a heading sensor is processed by the autopilot unit and the drive is controlled by the autopilot unit to determine the appropriate position of the rudder. The rudder is also linked to a steering wheel or other manual steering arrangement. When the steering wheel is moved during normal operation of the autopilot unit, this causes an interference with the control of the rudder by the drive and, if this interference has sufficient magnitude and duration, this triggers override of the autopilot unit, returning the vessel to manual control via the steering wheel. The override may alternatively be triggered by detection of rudder movement by a sensor.

4 Claims, 3 Drawing Sheets

AUTOPILOT SYSTEM

This is a continuation of application Ser. No. 07/631,377, filed Dec. 20, 1990, now abandoned.

BACKGROUND OF THE INVENTION

1. Field of the Invention

The present invention relates to an autopilot system, and in particular to an arrangement for permitting manual override of the autopilot system.

2. Summary of the Prior Art

It is now common for even relatively small boats or other vessels to have an autopilot which permits automated steering of the vessel. However, there are many occasions when the autopilot system needs to be overriden and manual control be permitted. In general, such override systems must operate quickly, because they may be needed e.g. to permit the vessel to avoid an impending hazard. Of course, override may also be used at other times for convenience.

SUMMARY OF THE INVENTION

At present autopilot systems can only be overriden by completely disengaging the autopilot, but then a key or switch has to be operated, which may not be conveniently available if the reason for overriding the autopilot is an impending hazard.

The present invention seeks to provide an override for an autopilot, and proposes that the information to trigger the override is derived from the steering system of the vessel. The information may be derived directly from the rudder position, load application to steering system or may be derived from signals to or from the motor drive to the rudder. Preferably when the steering system of the vessel is operated, this exerts interference on the rudder drive, and if this interference exceeds a predetermined magnitude and is maintained for a predetermined time (to prevent accidental override), the interference can be detected and this used to trigger the override of the autopilot. Indeed, it is possible to permit those magnitudes and times to be user selectable. Alternatively, the rudder position itself may be detected, e.g. by one or more electronic sensors monitoring the position by e.g. a potentiometer controlled by rudder position, or similar arrangements.

As stated above, where the override trigger is obtained from a motor drive to the rudder, the present invention proposes that interference with the normal rudder movement be detected to trigger the override. It may be noted that an autopilot system for a vessel will normally drive the rudder in order to compensate for changes in the heading of the vessel as it moves through the water. However, even when the vessel is moving relatively straight, so that the rudder is not being driven, an attempt to turn the vessel will then immediately cause the autopilot to drive the rudder to return the vessel to its programmed course, and then that drive will be interferred with by the manual input to trigger the override.

BRIEF DESCRIPTION OF THE DRAWINGS

An embodiment of the invention will now be described in detail, by way of example, with reference to the accompanying drawings in which.

DETAILED DESCRIPTION

Figure 1A:
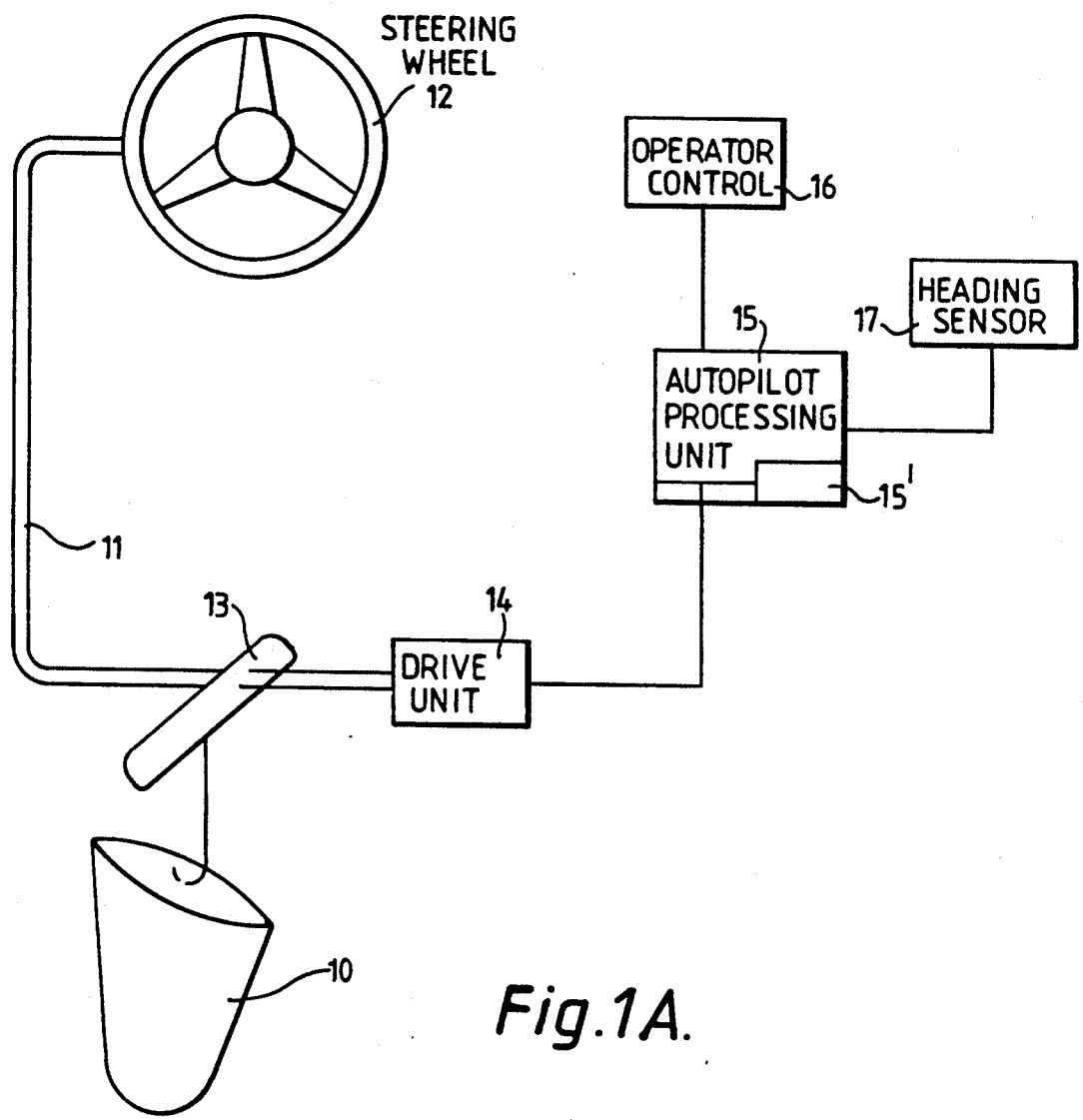
FIG. 1A and FIG. 1B each show a schematic view of an autopilot system in which the present invention may be incorporated.

Referring first to FIG. 1A, the rudder 10 of a vessel is connected via a suitable linkage 11 to a steering wheel 12, or other steering system, to enable the rudder 10 to be controlled manually. The link 11 can be mechanical, using rods or cables, or could be hydraulic. When the steering wheel 12 is turned, the link 11 transmits the movement to the rudder 10 and this steers the vessel. It can be noted that, for some vessels, the action of the rudder 10 is provided by swiveling the propellers themselves. As illustrated in FIG. 1A, the link 11 passes via a connection 13 to the rudder 10. The connection 13 is connected to a drive unit 14, which drive unit 14 is connected to an autopilot processing unit 15. When the vessel is being steered by the autopilot, the autopilot processing unit 15 transmits signals to the drive unit 14, which moves the connection 13 so as to cause the appropriate rudder movement. In practice, the drive unit 14 will normally be a motor system, and it may also be noted that parts of the link 11 and connection 13 may be common to each other.

As illustrated, the autopilot is connected to a suitable operator control 16 which inputs commands to the autopilot processing unit 15 via suitable operator inputs. An audible alarm may be incorporated in the operator control 16. Furthermore, there is a heading sensor 17 which is a transducer generating information concerning the orientation of the vessel, and which in turn generates signals to the autopilot processing unit 15. Furthermore, signalling between the autopilot processing unit 15 and the drive unit 14 will depend on the particular electronic arrangement envisaged. For example, if motor drive amplifiers are contained within the autopilot processing unit 15, then full power signals may be transmitted directly to the drive unit 14, in which case the drive unit 14 can be relatively simple. On the other hand, if only low level signals are to be transmitted between the autopilot processing unit 15 and the drive unit 14, then full power electronics system is required in the drive unit 14.

The operation of the system shown in FIG. 1A when the autopilot is operating may be conventional, and therefore will not be discussed in detail. The present invention is particularly concerned with an arrangement for overriding the normal autopilot functions. Suppose that, in the arrangement shown in FIG. 1A, the autopilot is operated, so that the autopilot processing unit 15 transmits signals to the drive unit 14 to control the connection 13 and hence the rudder 10. If the steering wheel 12 is then turned, this motion is transmitted via the link 11 and acts as an interference to the drive unit 14. Normal (autopilot controlled) rudder movement cannot occur, and the motor speed of the drive unit 14 is restricted, as compared with its normal operation when controlled by the autopilot processing unit 15. This limiting of the operation of the motor of the drive unit 14 generates signals within the motor itself which are passed to the autopilot processing unit 15. A voltage is applied to the motor, to drive it, then the voltage is turned off for a very short time. The motor continues to turn and so acts as a generator and the generated voltage is relative to the motor speed. This voltage is then used as the signals to the autopilot processing unit 15. If those signals last for a sufficient time, this can be used to trigger the override of the autopilot, this operation being detected by a suitable means 15' which controls the override of the autopilot.

Thus, when the steering wheel 12 is used to turn the vessel the resultant rudder movement is picked up by the autopilot processing unit 15 via suitable sensors in the drive unit 14. The autopilot processing unit 15 then transmits signals to the drive unit 14 in an attempt to restore the original rudder position. The mechanical advantage of the steering wheel 12 to the rudder 10 is such that normal rudder movement under the influence of the autopilot cannot occur, and if the speed of the motor of the drive unit 14 remains below a predetermined limit (e.g. one fifth of the full speed) for a predetermined time (e.g. at least one quarter of a second) when the motor is driven by the autopilot processing unit 15, the criteria for override are satisfied, and the drive unit 14 may be operated to discontinue the drive voltage to the motor and clutch, so that the autopilot is disengaged and steering is via the steering wheel 12 only. Alternatively, the influence of the autopilot may be limited, without being completely disengaged.

Figure 2:
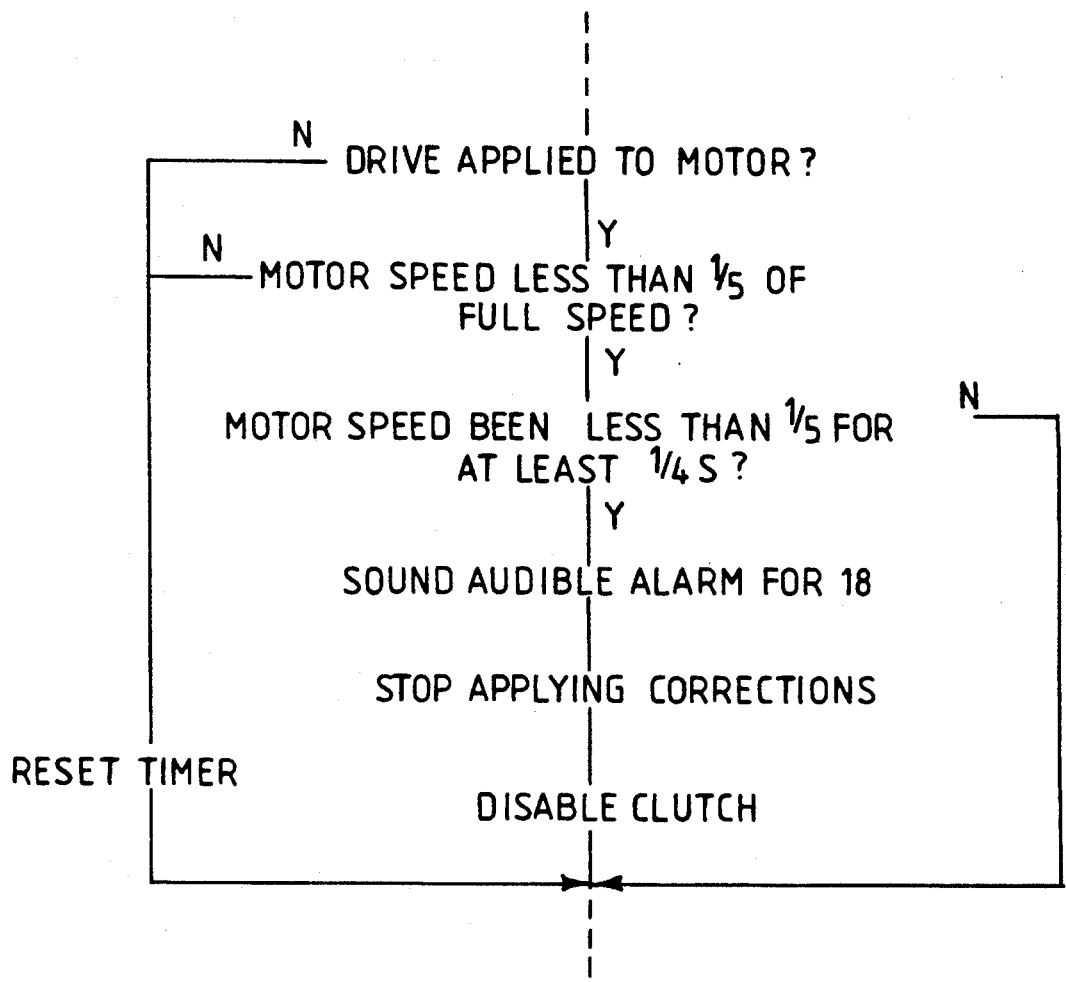
FIG. 2 is a flow diagram of one embodiment of an autopilot override arrangement according to the present invention.

This process is illustrated graphically in FIG. 2, in which the means 15' of the autopilot processing unit 15 is arranged to detect when the motor speed is less than one fifth of full speed. When the motor speed is more than one fifth of the full speed, the autopilot is operating normally and the autopilot system operates with a periodic check (e.g. about 16 times per second) on that motor speed. However, when the motor speed is less than one fifth of full speed, and a drive is being applied, the autopilot processing unit 15 then makes periodic checks to see if that limiting of motor speed has been maintained for at least one quarter second. This time limit is desirable in order to prevent very short interruptions to the motor speed due to e.g. external factors, triggering autopilot override. If the motor speed has been limited for a least one quarter second, then override of the autopilot ocurrs, and an alarm is sounded at the operator control 16, the autopilot is disengaged, so that it stops applying corrections to the motion of the vessel, and the clutch of the drive unit 14 is disengaged.

Figure 1B:
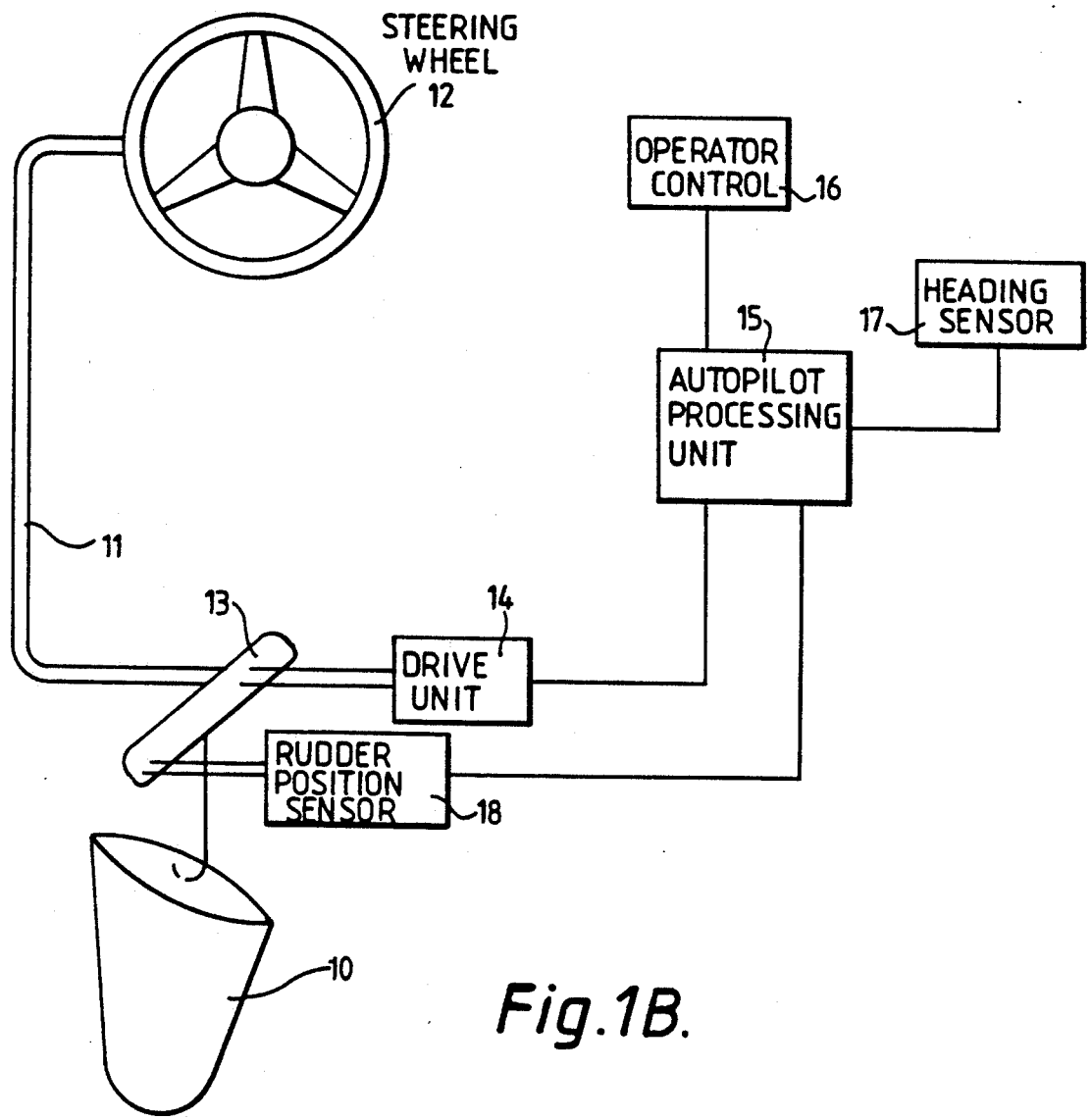

In an alternative embodiment of the present invention, shown in FIG. 1B, the position of the rudder 10 is detected by a rudder position sensor 18. This sensor 18 measures rudder movement, and transmits a suitable signal to the means 15' of the autopilot processing unit 15. Again, forced rudder movement which interferes with normal movement applied by the autopilot may be detected and if that is maintained for sufficiently long, override ocurrs. Thus, the action of the rudder position sensor 18 replaces the detection of motor signals from the drive unit 14. The choice of system is, however, dependent on the particular application.

Thus, by obtaining signals from the steering system, the present invention provides a simple way of achieving override of an autopilot.

What is claimed is:

1. An autopilot system for a marine vessel comprising a steering system including means for determining the direction of movement of the vessel and user operable means for controlling the direction determining means, an autopilot unit for automatically controlling the direction determining means, and means for overriding the control of the direction determining means by the autopilot unit; wherein the override means is operatively connected to the steering system and arranged such that actuation of the user operable means causes the actuation of the override means, and further wherein the override means is arranged to be actuated when the actuation of the user operable means exceeds a predetermined magnitude of actuation for a predetermined duration of actuation.

2. An autopilot system according to claim 1, wherein the direction determining means is a rudder, and the override means includes means for detecting the displacement of the rudder.

3. An autopilot system according to claim 1, wherein the steering system further includes a linkage (11,13) between the direction determining means (10) and the user operable means (12) and the override means is arranged to detect changes in said linkage (11,13) due to actuations of said user operable means (12).

4. An autopilot system according to claim 3, wherein the override means is arranged to detect changes in said linkage as an interference to said autopilot unit.

* * * * *